May 24, 1960  L. G. TIEDE  2,937,469
FISHING BOBBER

Filed Jan. 2, 1959  2 Sheets-Sheet 1

INVENTOR.
LEO G. TIEDE
BY
FINN G. OLSEN
ATTORNEY

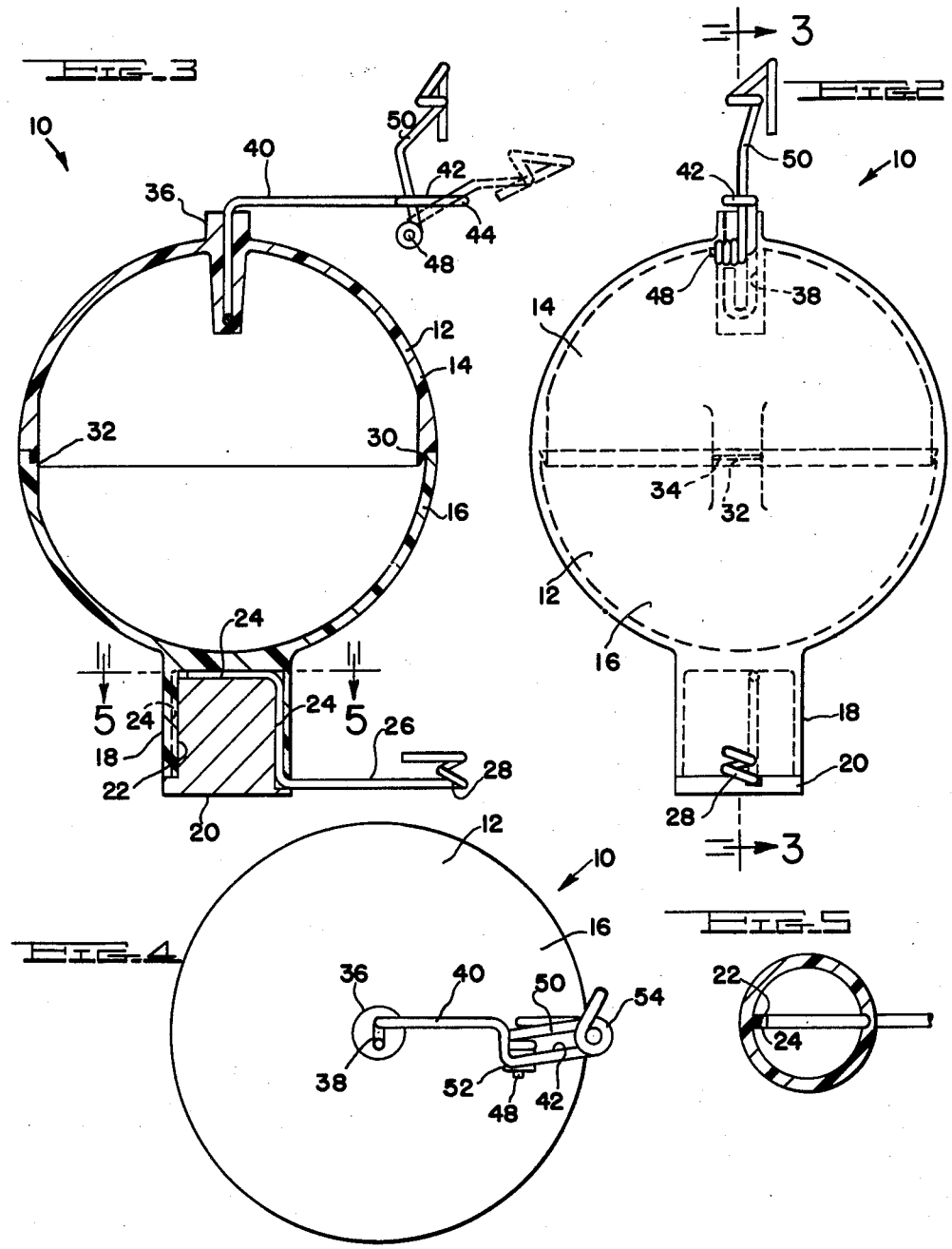

United States Patent Office 2,937,469
Patented May 24, 1960

2,937,469

FISHING BOBBER

Leo G. Tiede, 2558 Clemenceau Road, Windsor,
Ontario, Canada

Filed Jan. 2, 1959, Ser. No. 784,587

14 Claims. (Cl. 43—44.88)

The present invention relates to fishing devices in general and more particularly to fishing bobbers used in still fishing to maintain the bait a desired depth under water and to indicate a strike.

Fishing bobbers are very common and are extensively used, but those heretofore known generally have one or more undesirable characteristics, one of which is that they are frequently the cause of loosing a fish when used in conjunction with a rod and reel while fishing in deep water. It is often desired to fish near the water bed and when fishing in deep water a substantial length of line is required below the fishing bobber with the obvious result that, when reeling in, the bobber strikes the tip of the rod with still a substantial length of line in the water. When using most prior fishing bobbers it then becomes necessary either to remove the bobber or to pull in the remainder of the line by hand. Both courses of action are objectionable, because either one can be the cause of loosing a fish.

Some efforts have been made to provide a fishing bobber which overcomes this undesirable characteristic but without marked success either because of the complexity of the fishing bobber mechanism, cost factors, or the like.

Another undesirable characteristic of the conventional fishing bobbers heretofore used is that they require attaching the bobber to the fishing line in a fixed location prior to casting the bobber and baited line into the water. This requires the fisherman to know the depth of the water if he wishes to position his bait a prescribed distance above the water bed, and it will be readily recognized that it is not always possible for him to make such a measurement of the depth of the water at the desired location of the bobber.

Accordingly, it is an object of the present invention to provide a fishing bobber which will be automatic in operation in positioning the bait a desired distance above the water bed after the baited line has been cast into the water.

It is another object of the present invention to provide a fishing bobber which is constructed and arranged so that it will allow the fisherman to reel in his line completely after a strike regardless of the amount of line below the fishing bobber.

It is still another object of the present invention to provide a fishing bobber which is constructed and arranged so that it will be automatic in operation in positioning the bait a desired distance above the water bed and which also functions to allow the fisherman to reel in his line completely after a strike.

It is still another object of the present invention to provide a fishing bobber of the foregoing character which is characterized by the simplicity and few in number of its parts and the ease with which they can be assembled, thereby providing a simple, low cost fishing device capable of large volume production.

It is still another object of the present invention to provide a fishing bobber of the foregoing character which has its component parts constructed and arranged to provide interlocking relationship so that the assembly of the parts can be performed in the most simple manner and proper alignment of the parts is assured so that the fishing bobber will function to give most optimum results.

It is still another object of the present invention to provide a fishing bobber of the foregoing character which is characterized by the unique line tensioning device employed to maintain the fishing line between the bait and the bobber taut after the bait has descended to the proper distance above the water bed.

Other objects of this invention will appear in the following description and appended claims, reference being had to the accompanying drawings forming a part of this specification wherein like reference characters designate corresponding parts in the several views.

In the drawings:

Figure 2 is a front elevational view of the fishing bobber illustrated in Figure 1;

Figure 3 is a sectional view taken on the line 3—3 of Figure 2 and showing the line tensioning element in solid in one position of operation and in phantom in another position of operation;

Figure 4 is a top plan view of the fishing bobber with the line tensioning element shown in the solid line position of Figure 3; and Figure 5 is a fragmentary section taken on the line 5—5 of Figure 3.

Figure 1:
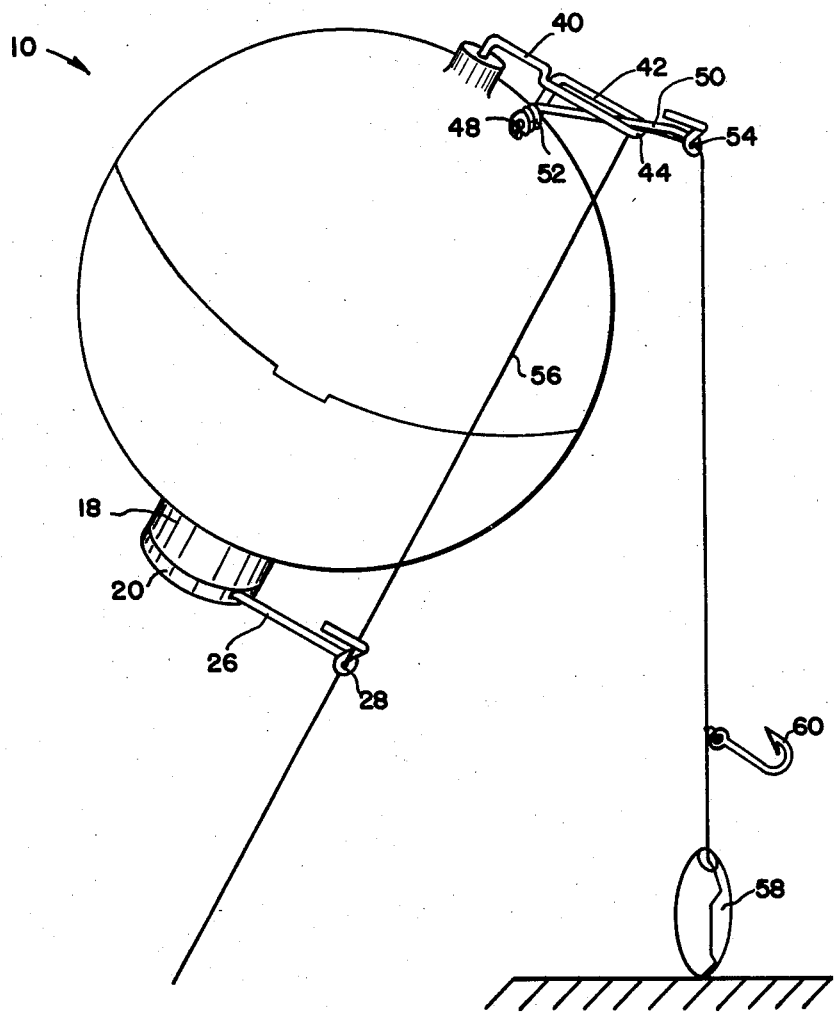
Figure 1 is a perspective view of a fishing bobber embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The fishing bobber 10 includes a bouyant float 12 formed from two generally hemi-spherical shaped sections 14 and 16. Each of the sections 14 and 16 are preferably made of a light plastic material. The normally lower section 16 has a collar 18 projecting axially from its lower end portion, and a weight 20, formed from zinc or similar material, is press fitted into the collar 18.

The inner wall of the collar 18 has a rib 22 extending in an axial direction and the weight 20 has a groove 24 for receiving the rib 22 in interlocking relation so that the weight 20 can be inserted into the collar in only one position. The groove 24 continues across the base of the weight 20 and in an axial direction on the diametrical opposite side from the groove portion for receiving the rib 22. Fitting into the continuing portion of the groove 24 is the one end of the arm 26 which is preferably made from a non-corrosive metal wire of relatively stiff resilient properties. The arm 26 extends laterally from the collar 18, terminating in an eyelet 28 adapted to receive a fishing line. It is to be observed that the arm 26 with its eyelet 28 always will be in a fixed position relative to the section 16 by virtue of the interlocking relationship between the collar 18, the weight 20 and the one end of the arm 26.

The sections 14 and 16 are secured together at the overhanging lip edges 30 by any suitable cement. In order to assure that the sections 14 and 16 will be cemented together in proper relationship to one another, the lower section 16 has a tongue 32 which fits into the slot 34 in mating relationship, thus assuring an established relationship between the upper section 12 and the arm 26 with its eyelet 28.

The normally uppermost section 12 has an end portion 36 having a recess or socket 38 formed therein. As can be seen in Figure 4, the socket 38 is elliptical in cross section with the major axis of the ellipse in a plane normal to the arm 26. Press fitted into the socket 38 is an arm 40, also preferably formed from a non-corrosive metal wire having relatively stiff resilient properties. The one end of arm 40 is U-shaped, as seen in Figure 2, so as to provide a tight and normally irremovable connection with the end portion 36. The main body of the arm 40 projects laterally from the end portion 36 in a vertical plane containing the arm 26 and at its outer end has an elongated eyelet 42 which converges toward the outer V-shaped segment 44.

It is to be observed that the eyelets 28 and 42 are generally in axial alignment laterally outward of the float 12, and by virtue of the manner in which the various parts are assembled together, these eyelets will always be in such alignment. Thus, there will be no need to adjust the parts after assembly.

Referring now in particular to Figure 1, it can be seen that the terminal end of arm 40 is deflected downwardly from the plane of the elongated eyelet 42 and then is deflected at a right angle to form a short shaft-like end 48. Pivotally mounted on the shaft-like end 48 is a line tensioning element 50 formed of similar material as arms 28 and 42. The pivotal mounting is accomplished by means of the spiral end 52 which forms one end of the tensioning element 50, said spiral end 52 fitting over the shaft-like end 48. The tensioning element 50 then has a straight portion fitting through the elongated eyelet 42 and terminating in another eyelet 54. The tensioning element 50 is movable from the upright position shown in solid lines in Figure 3 to the normal line tensioning position shown in phantom in Figure 3, or in solid lines in Figure 1. When in the normal line tensioning position the straight portion of the tensioning element 50 will fit snugly into the outer segment 44 of the eyelet 42.

In operation, a fishing line 56 is initially passed through the eyelets 28, 42 and 54. From the construction of all the eyelets, it will be seen that the line 56 can be inserted thereinto without removing the sinker 58 or the fish hook 60. The sinker will normally be attached to the free end of line 56 and the fish hook 60 will be attached to line 56 the distance it is desired to have the baited hook above the water bed.

When cast out, the fishing bobber 10 will be against the hook 60 and will remain there until the fishing bobber 10 strikes the surface of the water. When the fishing bobber 10 rests on the water surface, the sinker 58 which is heavier than the weight 20 will invert the fishing bobber 10 from the position shown in Figure 1, and the line 56 will slide through the eyelets 28, 42 and 54 until the sinker 58 rests upon the water bed. At this time, the tension will be off the line 56 and the weight 20 will cause the fishing bobber 10 to invert itself to the position of Figure 1. The line will then be in the one end of eyelet 42 against the segment 44 and the line tensioning element 50 will be pivoted to a position clamping the line 56 therebeneath against segment 44. The line 56 will now remain in this position with the hook 60 the desired distance above the water bed.

Once a strike has been made by a fish, the fishing bobber 10 will be inverted and as the line 56 is reeled in, the fishing bobber 10 is again free to slide relative to the line 56, thereby allowing complete reeling in of the line 56 without interference by the fishing bobber 10.

From the foregoing it will be understood that a fishing bobber has been described which will function automatically to position the fish hook the desired distance above the water bed, and will not interfere with reeling in the fish line. Furthermore, it can be seen that a relatively simple device is provided which can be assembled in such a manner to assure optimum results and trouble free operation.

Having thus described my invention, I claim:

1. A fishing bobber comprising a bouyant float having opposite end portions, one of said end portions being heavier than the other end portion so that said other end portion normally will be uppermost when said bobber is floating freely in water, said one end portion having a first arm extending laterally therefrom and having a first eyelet in its free end through which a fishing line can be passed, said other end portion having a second arm extending laterally therefrom and having an elongated eyelet in its free end, one segment of said elongated eyelet being generally in alignment with said first eyelet for receiving said fishing line, a line tensioning element pivotally mounted on said second arm and extending through said elongated eyelet and having an eyelet adjacent the free end thereof through which said fishing line can be passed, said line tensioning element being mounted so that when said bobber is in its normal position and the free end of said fishing line depends from the eyelet of the tensioning element said tensioning element will be pivoted to said one segment of the elongated eyelet clamping said line and when said bobber is in other positions than its normal position said tensioning element will be pivoted away from said one segment allowing said line to be pulled freely through said eyelets.

2. A fishing bobber comprising a bouyant float having opposite end portions, one of said end portions being heavier than the other end portion so that said other end portion normally will be uppermost when said bobber is floating freely in water, means mounted on and extending from said end portions and having at their free ends eyelets for receiving and guiding a fishing line, and a fishing line tensioning means operatively connected to the means mounted on said other end portion and adapted to clamp said fishing line when said bobber is in its normal position and to release said fishing line to allow free movement through said eyelets when said bobber is inverted from its normal position.

3. A fishing bobber comprising a generally spherical float having two hollow hemi-spherical sections secured together in liquid-tight relation and having axially aligned end portions one heavier than the other, said sections having mating parts so that when secured together their circumferential edges will be in predetermined positions relative to one another, means mounted on and extending laterally from said end portions and having at their free ends eyelets for receiving and guiding a fishing line, said means being retained in said end portions in predetermined relation with respect to said mating parts so that said eyelets are in axial alignment when said float and said means are assembled together, and a fishing line tensioning means operatively connected to the means mounted on one end portion and adapted to clamp said fishing line when said bobber is in one position with its axis vertical and to release said fishing line when said bobber is inverted.

4. A fishing bobber comprising a generally spherical float with a collar extending from one end, a weight of predetermined size fitted into said collar so that said one end will be heavier than the other end of said float, means retained in said collar by said weight and extending laterally from the collar and terminating in an eyelet, said collar, weight and means having interlocking portions so that said means can extend only in a predetermined radial direction from the float, means mounted in and extending laterally from the other end of said float and terminating in an eyelet generally in axial alignment with the first-named eyelet, and a fishing line tensioning means operatively connected to the second-named means and operable to clamp a line in the second-named eyelet when the float is in a position with the collar lowermost and to release a line in the second-named eyelet when the float is inverted.

5. A fishing bobber comprising a generally spherical float having two hollow hemi-spherical sections secured together in liquid tight relation and having interlocking portions so that during assembly operations the sections can be secured together in only one predetermined position, one of said sections having a collar extending from one end, a weight of predetermined size fitted into said collar so that said one section will be heavier than said other section, means retained in said collar by said weight and extending laterally from said collar and terminating in an eyelet, said collar, weight and means having interlocking portions so that said means can extend only in a predetermined radial direction from the float, means mounted in and extending laterally from the end of the other section and terminating in an eyelet in alignment with the first-named eyelet, and a fishing line tensioning means operatively connected to the second-named means and operable to clamp a line in the second-named eyelet when the float is in a position with the collar lowermost and to release a line in the second-named eyelet when the float is inverted.

6. A fishing bobber as claimed in claim 5 wherein said other section has a socket for mounting the second-named means, said socket being shaped to assure that the second-named means will be in proper alignment with the first-named means.

7. A fishing bobber comprising a generally spherical float having two hollow hemi-spherical sections secured together in liquid tight relation and having interlocking portions so that during assembly operations the sections can be secured together in only one predetermined position, one of said sections having a collar extending coaxially from one end, a weight of predetermined size fitted into said collar so that when said bobber is floating freely in water the weighted section normally will be lowermost, a first arm retained at one end in said collar by interlocking action with said weight and extending laterally therefrom and having an eyelet in its free end through which a fishing line can be passed, said collar, weight and first arm being interlocked so that said first arm can extend only in a predetermined radial direction from said float, a second arm mounted in the end of said other section and extending laterally therefrom and having an elongated eyelet in its free end, one segment of said elongated eyelet being generally in alignment with said first eyelet for receiving said fishing line, a line tensioning element pivotally mounted on said second arm and extending through said elongated eyelet and having an eyelet adjacent the free end thereof through which said fishing line can be passed, said line tensioning element being mounted so that when said bobber is in its normal position and the free end of the fishing line depends from the eyelet of the tensioning element said tensioning element will be pivoted to said one segment of the elongated eyelet clamping said line and when said bobber is in other positions than its normal position said tensioning element will be pivoted away from said one segment allowing said line to be pulled freely through said eyelets.

8. A fishing bobber as recited in claim 7 wherein said sections have relatively thin rigid plastic walls.

9. A fishing bobber as recited in claim 7 wherein said arms and said line tensioning element are formed from relatively rigid resilient wire-like material.

10. A fishing bobber as recited in claim 7 wherein said arms extend laterally sufficient far from the spherical float so that a line extending through said eyelets is free from contact with said spherical float.

11. A fishing bobber having a float with opposite end portions, one end portion being heavier than the other end portion so that said other end portion normally will be uppermost when the bobber is floating freely in a vertical position in water, means projecting horizontally from each end portion which means are adapted to have a fishing line passed vertically through them, the means at said other end comprising a relatively stiff wire element press fitted into the normally upper end portion of the float and extending horizontally therefrom and forming an elongated eyelet at the free end, the terminal end of said wire element being deflected out of the plane of said eyelet and in a horizontal direction to form a short shaft-like part, and a fishing line tensioning element formed from relatively stiff wire having one end spirally wound on said shaft-like part in pivotal relation and extending through said elongated eyelet so as to be pivotally movable against and away from one end segment of said eyelet, the other end of said tensioning element having an eyelet adapted to receive said fishing line.

12. A fishing bobber as recited in claim 11 wherein said shaft-like part is below said elongated eyelet and adjacent the end of the eyelet nearest said float.

13. A fishing bobber as recited in claim 11 wherein said elongated eyelet converges toward said one end segment to a width approximating the thickness of the wire forming the tensioning element.

14. A fishing bobber weighted so that it will assume a normally vertical upright position when floating freely in water comprising a bouyant float having opposite end portions one of which is normally uppermost when said bobber is floating freely in water, means mounted on said float with free ends thereof extending laterally from said opposite end portions and having at said free ends fishing line guide means for receiving and guiding a fishing line, and a fishing line tensioning means operatively connected to one of said free ends for clamping said fishing line in the guide means of said one free end when said bobber is in its normal position and to release said fishing line to allow free movement through said guide means when said bobber is inverted from its normal position.

References Cited in the file of this patent
UNITED STATES PATENTS
2,493,971    Johnson _____ Jan. 10, 1950